United States Patent [19] [11] 3,936,715
Nixon et al. [45] Feb. 3, 1976

[54] ELECTRONIC TRIM SYSTEM
[75] Inventors: John M. Nixon, Springdale; James R. Younkin, Fayetteville, both of Ark.
[73] Assignee: Edo-Aire Mitchell Industries, Inc., Mineral Wells, Tex.
[22] Filed: Aug. 9, 1974
[21] Appl. No.: 496,357

[52] U.S. Cl. ............... 318/580; 318/584; 318/599; 318/677; 318/681; 244/77 M
[51] Int. Cl.² ............... B64C 13/16; G05D 1/00
[58] Field of Search ........... 318/580, 584, 599, 677, 318/681; 244/77 M

[56] References Cited
UNITED STATES PATENTS

| | | | |
|---|---|---|---|
| 3,123,324 | 3/1964 | Hammell | 318/580 X |
| 3,652,912 | 3/1972 | Bordonaro | 318/681 X |
| 3,682,417 | 8/1972 | Burklund et al. | 318/584 X |
| 3,719,337 | 3/1973 | Gardner | 318/584 X |
| 3,733,039 | 5/1973 | O'Connor et al. | 318/584 X |

*Primary Examiner*—B. Dobeck
*Attorney, Agent, or Firm*—Richards, Harris and Medlock

[57] ABSTRACT

A system for electrically actuating the pitch trim of an aircraft in both autopilot and manual modes includes a primary pitch servomotor coupled to a primary control surface and a pitch trim servomotor for actuating a trim control surface. In the autopilot mode, an electrical signal applied to the primary pitch servomotor by the autopilot is also applied to two channels of a trim controller providing complementary output signals applied to the pitch trim servomotor. Each channel of the trim controller includes a voltage translator for providing a single ended voltage applied to an integrator that generates an output varying with the time average of the electrical signal applied to the primary pitch servomotor. This time average signal as generated in each channel is chopped into an alternating current signal for driving an output stage. The chopping duty cycle of each channel is varied in accordance with the absolute value of a time average of the electrical signal applied to the primary pitch servomotor. This absolute value signal is applied to a variable time constant circuit for driving a multivibrator that provides the chopping signal to each of the channels of the trim controller. For manual operation, a manual controller disables the automatic pilot and drives the output stage of each channel of the trim controller to provide complementary output signals to the pitch trim servomotor.

22 Claims, 5 Drawing Figures

ELECTRONIC TRIM SYSTEM

This invention relates generally to automatic pilot systems for aircraft and the like, and more particularly relates to an electronic system for adjusting the pitch trim of an aircraft in either an autopilot or manual mode.

Virtually all general aviation aircraft have a pitch trim system which may be used to establish a desired pitch attitude without a force being applied to the primary pitch control surface by the pilot, or by an autopilot. In normal flight, relatively large pitch trim adjustments are required when transitioning from take-off to climb, from climb to level flight, from level flight to descent, and during an approach and landing. Proper adjustment of the pitch trim materially reduces pilot fatigue when the aircraft is operated in the manual mode and is virtually essential in many aircraft for safe operation of the aircraft. Additional convenience and safety have heretofore been provided by electrically operated pitch trim systems having a switch mounted on the control yoke of the aircraft. This permits the pilot to adjust trim without distraction in critical situations such as an IFR approach. When an aircraft is being operated in an autopilot mode, it is important that the aircraft be properly trimmed to provide the most efficient configuration, reduce the load on the autopilot, and prevent abrupt changes in attitude when transitioning from the autopilot mode to the manual mode.

Prior automatic trim systems have heretofore detected the force being applied to the pitch control surface and have operated the pitch trim in a manner to reduce this force to zero. For example, U.S. Pat. No. 3,328,548 issued June 27, 1967, to J. R. Younkin et al describes a system wherein automatic pitch trim adjustments are made in response to the difference in tension on the primary elevator cables. Other systems for automatically adjusting pitch trim utilize a torque detector on the output shaft of the primary pitch servomotor of the autopilot, the differential pressure in pneumatic servosystems, or the difference in magnetic clutch excitation in systems which use high speed magnetic clutches differentially geared to a drive train which operates the control surface.

Many general aviation autopilots in production at the present time utilize an integrating type servoactuator rather than a force generator. The integrating type servoactuator typically comprises a permanent magnet DC motor which drives the control surface through a high gear reduction system including a safety clutch. In such a system very little torque can be transmitted from the control surface back through the gear reducer to the motor. In fact, the gear ratio is so large that the clutch will slip before the servomotor can be back-driven by force on the control surface. As a result, the friction load on the motor is large in relation to the typical torque required to operate the control surface, particularly when the aircraft is operating near a trim condition. As a result, the pitch trim system utilized with this type of autopilot has heretofore included some means for sensing the force applied to the control surface that was separate from the primary servosystem.

This invention is concerned with an improved pitch trim system which automatically trims the aircraft in response to the voltage applied to an integrating type servomotor coupled to the primary control surface. Such a system has the advantage of requiring no separate sensing apparatus to detect the force applied to the primary control surface when operating in the autopilot mode.

In accordance with another embodiment of the invention, an automatic pilot includes a primary integrating type servosystem for moving a primary control surface of an aircraft. This servosystem includes a reversible integrating type servomotor coupled to the primary control surface and an interconnection for applying the electrical signal from the autopilot for actuating the integrating servomotor to a trim controller. A pair of amplifier channels as a part of the trim controller respond in opposite directions to the electrical signal applied to the direct current motor and each channel provides an output connected to opposite terminals of a pitch trim servomotor for operation in a manner to actuate a trim control surface in a direction to reduce the electrical signal applied to the integrating servomotr through the automatic pilot.

In accordance with a more specific embodiment of the present invention, the voltage signals applied to the primary integrating type servomotor are amplfied by a dual channel amplifier system wherein the duty cycle of each channel is varied in accordance with signals applied to the primary servomotor in mormal operation. The output from the amplifier system drives a trim servomotor at a rate and in a direction to change the attitude of the aircraft and thereby reduce the long term voltage signal applied to the primary servomotor.

In accordance with still another aspect of the invention, a high speed trim servomotor provides a manual trim mode. A single manual switch automatically deactivates the autopilot and operates the pitch trim motor at maxium speed in the desired direction.

A feature of the present invention is to provide a pitch trim system operating in a dual channel mode where any false command to or by either channel will not cause the system to operate while the opposite channel is operating normally. In the situation where two simultaneous independent failures in the amplifier channels cause uncontrolled operation, either failure can be detected prior to use by a preflight test procedure. This feature is achieved by the system of the present invention by utilizing dual parallel channel amplifiers generating amplitude modulated/variable duty cycle pulses applied to output stages of the amplifier channels thus determining the proper direction and speed of rotation of the pitch trim servomotor.

The novel features believed characteristic of this invention ae set forth in the appended claims. The invention itself, however, as well as other objects and advantages thereof, may best be understood by reference to the following detailed description of an illustrative embodiment, when read in conjunction with the accompanying drawings, wherein:

Figure 1:
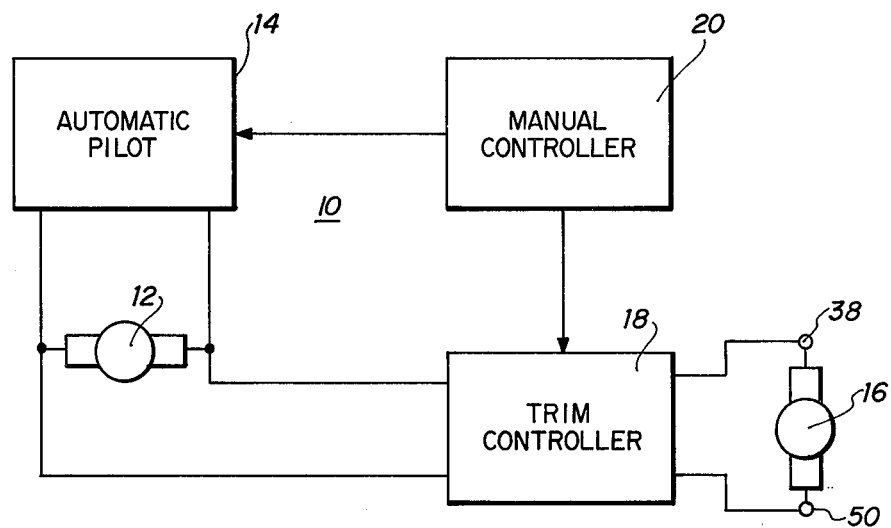
FIG. 1 is a block diagram of an electronic trim system in accordance with the present invention.

Referring now to the drawings, an electronic integrating trim system in accordance with the present invention is indicated generally by the reference numeral 10 in FIG. 1. The system 10 includes a reversible primary pitch integrating type servomotor 12 which is coupled to a control surface of an aircraft through a high gear reduction drive system which typically includes a safety clutch to permit the servo to be manually overridden. The servomotor 12 will typically be a reversible, direct current, permanent magnet motor and is coupled to actuate the pitch control surface of an aircraft, commonly referred to as the elevators, by a larger ratio gear reducer and overload clutch. The motor 12 is operated by a conventional automatic pilot 14. The servosystem of the present invention may also utilize an AC primary servomotor coupled to an automatic pilot providing the correct excitation signals.

The automatic pilot 14 may be of the type disclosed in U.S. Pat. No. 3,555,391. The autopilot 14 may drive the motor 12 with voltage signals of the type where one pole of the motor is grounded and the other swings positively or negatively, or where either one of the poles of the motor is held at ground while the other swings positively or negatively with respect to ground. The voltage signals applied to the primary servomotor 12 may be derived from a pitch command generated within the automatic pilot by, for example, an altitude hold function, a manual pitch command function, or a guid slope coupling function.

A trim servomotor 16 is coupled to operate the trim means associated with the primary control surface that is operated by the primary pitch servomotor 12. In the specific example, here being discussed, the servomotor 16 operates the pitch trim system by any suitable mechanical coupling.

To control the trim servomotor 16, the electrical signal applied to the servomotor 12 is coupled to inputs of a trim controller 18. The trim controller 18 responds to the electrical signal applied to the servomotor 12 to generate a control voltage to the trim servomotor 16 to position the trim means associated with the primary control surface to null the signal applied to the servomotor 12.

In addition to automatic control by means of the automatic pilot 14 and the trim controller 18, the trim servomotor 16 is also energized in accordance with a signal from a manual controller 20. Engaging the manual controller 20 disables the automatic pilot 14 and overrides the signal applied to the trim controller 18 from the servomotor 12. Disabling the automatic pilot 14 transfers the control of the servomotor 12 to the manual controller 20 and diabling the trim controller 18 allows the trim servomotor 16 to be controlled in accordance with a manual control signal coupled through the trim controller.

Figure 2:
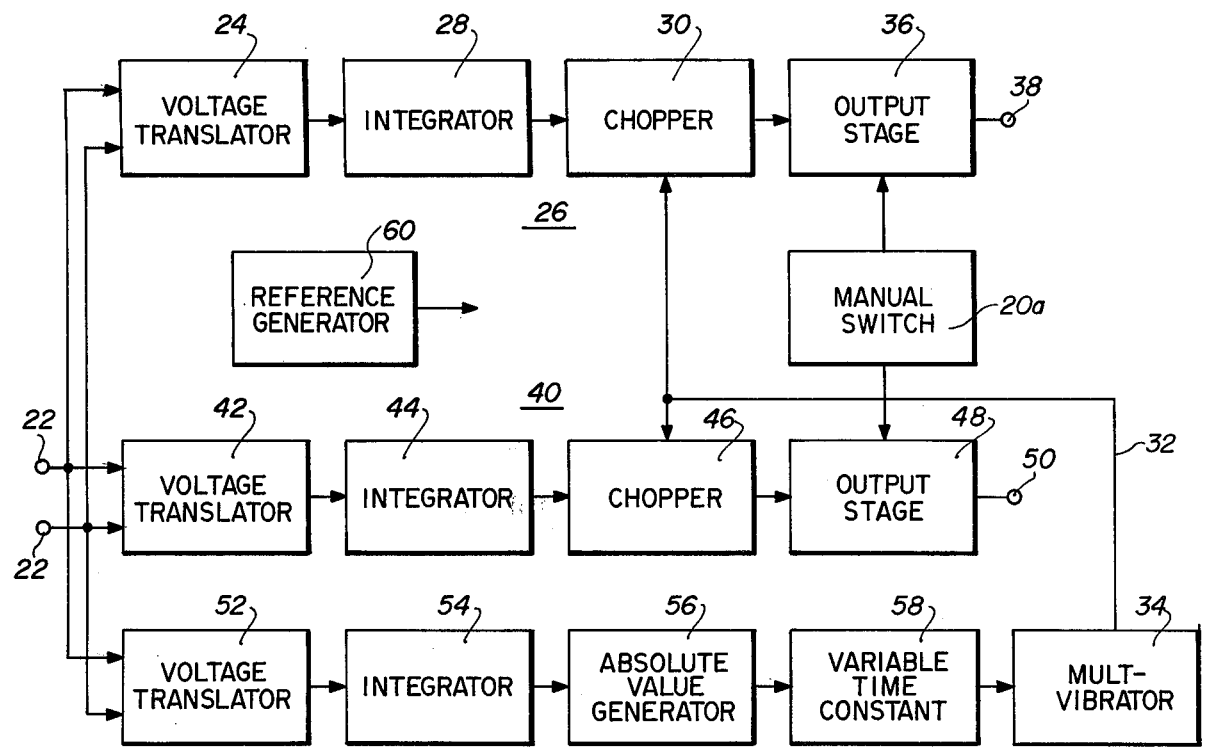
FIG. 2 is a block diagram of the trim controller of the electronic trim system shown in FIG. 1 including dual amplifier channels and a third channel for duty cycle modulating and two amplifier channels.

Referring to FIG. 2, the trim controller 18 is detailed as a block diagram wherein the electrical signal applied to the reversible direct current servomotor 12 is also applied to input terminals 22. Basically, the trim controller 18 comprises two identical amplifier channels 26 and 40 with the polarity of one channel reversed with respect to the polarity of the other channel, as will be explained with reference to FIG. 3.

An electrical signal applied to the terminals 22 is connected to the inputs of a voltage translator 24 of the amplifier channel 26. The voltage translator 24 converts the electrical signal applied to the servomotor 12 into a single ended voltage. Depending on the autopilot system, the electrical signal applied to the servomotor 12 varies with reference to ground, that is, one terminal of the servomotor is grounded and the other terminal varies plus or minus of ground. In other autopilot systems, the autopilot provides a differential electrical signal applied to the servomotor 12. In these systems, the electrical signal applied to the servomotor 12 varies either always above ground or always below ground. In the voltage translator 24 whatever electrical signal is applied to the servomotor 12, it is converted into a single ended voltage about a reference voltage generated at the output of a reference generator 60.

From the voltage translator 24, the electrical signal as applied to the servomotor 12 varies plus or minus about the reference voltage and this voltage is applied to an integrator 28. This is a long time constant integrator that functions to generate a time average of the electrical signal applied to the servomotor 12. In other words, the electrical signal applied to the servomotor 12 is time averaged to establish an average condition for energization of the servomotor 16.

In the normal flight of an aircraft, the electrical signal applied to the servomotor 12 is constantly varying so that the aircraft flies a commanded course. The integrator 28 averages this varying electrical signal over a reasonably long time period. This average gives an indication that the autopilot is having to correct more in one direction than the other which is indicative of a trim change requirement. Thus, the output of the integrator 28 represents a trim requirement for the aircraft.

The trim requirement voltage from the integrator 28 is applied to a chopper 30 wherein the applied voltage is chopped into a pulse rate modulated signal varying about the reference voltage of the reference generator 60. Whenever the average of the electrical signal applied to the primary servomotor 12 is other than zero, the output of the chopper 30 is a pulse rate modulated signal, as will be explained. The chopper 30 is driven by a pulse signal on a line 32 from the output of a multivibrator 34, to be explained. Thus, the chopping pulse rate of the chopper 30 varies with the output of the multivibrator 34.

The pulse rate signal from the chopper 30 is applied to an output stage 36 that comprises a power amplifier. The operation of the output stage 36 converts the pulse rate signal from the chopper 30 into an energizing voltage at an output terminal 38 connected to one terminal of the trim servomotor 16.

To energize the trim servomotor 16, the second amplifier channel 40 also receives the electrical signal at the input terminals 22 and generates an energizing voltage at an output terminal 50 to the trim servomotor that is 180° phase displaced from the output of the channel 26 at the terminal 38. The electrical signal applied to the servomotor 12 is also an input to a voltage translator 42 that functions as the voltage translator 24 to provide a single ended voltage from the electrical signal applied to the servomotor 12. The single ended voltage from the translator 42 varies about the reference voltage from the reference generator 60 and is applied to a long term integrator 44 similar to the integrator 28 to provide a time average of the output of the translator 42. This time average voltage is converted into a pulse rate modulated signal varying about the reference voltage of the reference generator 60 in a chopper 46 that also receives a chopping pulse from the multivibrator 34. The pulse rate modulated signal from the chopper 46 is applied to a power amplifier output stage 48 to produce an energizing voltage on the terminal 50 that is the complement of the energizing voltage at the terminal 38. The terminal 50 is connected to the opposite terminal of the trim servomotor 16.

In addition to controlling the trim servomotor 16 through the autopilot, control is also possible through the manual controller 20. The manual controller 20 is connected to the trim controller 18 at the output stage 36 for the channel 26 and the output stage 48 for the channel 40. As will be explained, operation of the manual controller 20 overrides the input to the output stages 36 and 48 to disable the channels 26 and 40 from responding to the electrical signal at the input terminals 22. The manual controller 20 directly drives the output stages 36 and 40 to produce a control voltage across the terminals 38 and 50 to energize the trim servomotor 16.

An output from the multivibrator 34 varies the chopping rate to the choppers 30 and 46 to duty cycle modulate each of the amplifier channels 26 and 40 in accordance with the electrical signal applied to the servomotor 12 to limit the rate at which the trim servomotor 16 operates.

An electrical signal at the input terminals 22 is applied to a voltage translator 52 that is similar to the translators 24 and 42 to provide a single ended voltage to the input of an integrator 54 that varies about the reference voltage of the reference generator 60. The integrator 54 again provides a time average of the electrical signal applied to the servomotor 12. This integrator is similar to the integrators 28 and 44 with the exception that the integrator 54 has a variable time constant that is determined and set by the dynamics of a particular aircraft. In other words, the amount of gain of the integrator 54 and the time constant thereof effects the aircraft trim. A very long time delay will allow large out of trim conditions to exist in the system for a long period of time because of limited correction ability of a slowly pulsing control voltage to the trim servomotor 16.

The time average output of the integrator 54 is applied to the input of an absolute value generator 56 wherein a signal varying only with the magnitude of the input is generated at an output to be applied to a variable time constant network 58. The variable time constant network 58 functions as a time delay having different characteristics depending on the input signal. An input signal applied to the variable time constant network 58 is delayed by some given amount of time before appearing at an output terminal connected to the multivibrator 34. However, when the input signal applied to the network 58 returns to ground the output of the variable time constant network 58 quickly resets to a zero condition. Thus, the network 58 has a long time constant to a signal applied initially at an input terminal but resets quickly when the input has been removed. The output of the network 58 triggers the multivibrator 34 to provide a pulse train on the line 32 as the chopping frequency to the choppers 30 and 46.

With the variable time constant network 58 and the multivibrator 34 a large out-of-trim condition of an aircraft will not immediately effect the operation of the trim servomotor 16. In some conditions, if the system immediately follows an out-of-trim condition to initiate a pitch requirement correction, the operating capabilities of the aircraft may be exceeded. Thus, the circuit allows for a delay of any large pitch trim changes for a predetermined time interval.

Connected to the various components of the system of FIG. 2 is the reference generator 60. This generator 60 provides the reference voltages to each of the various circuits as described.

Figure 3:
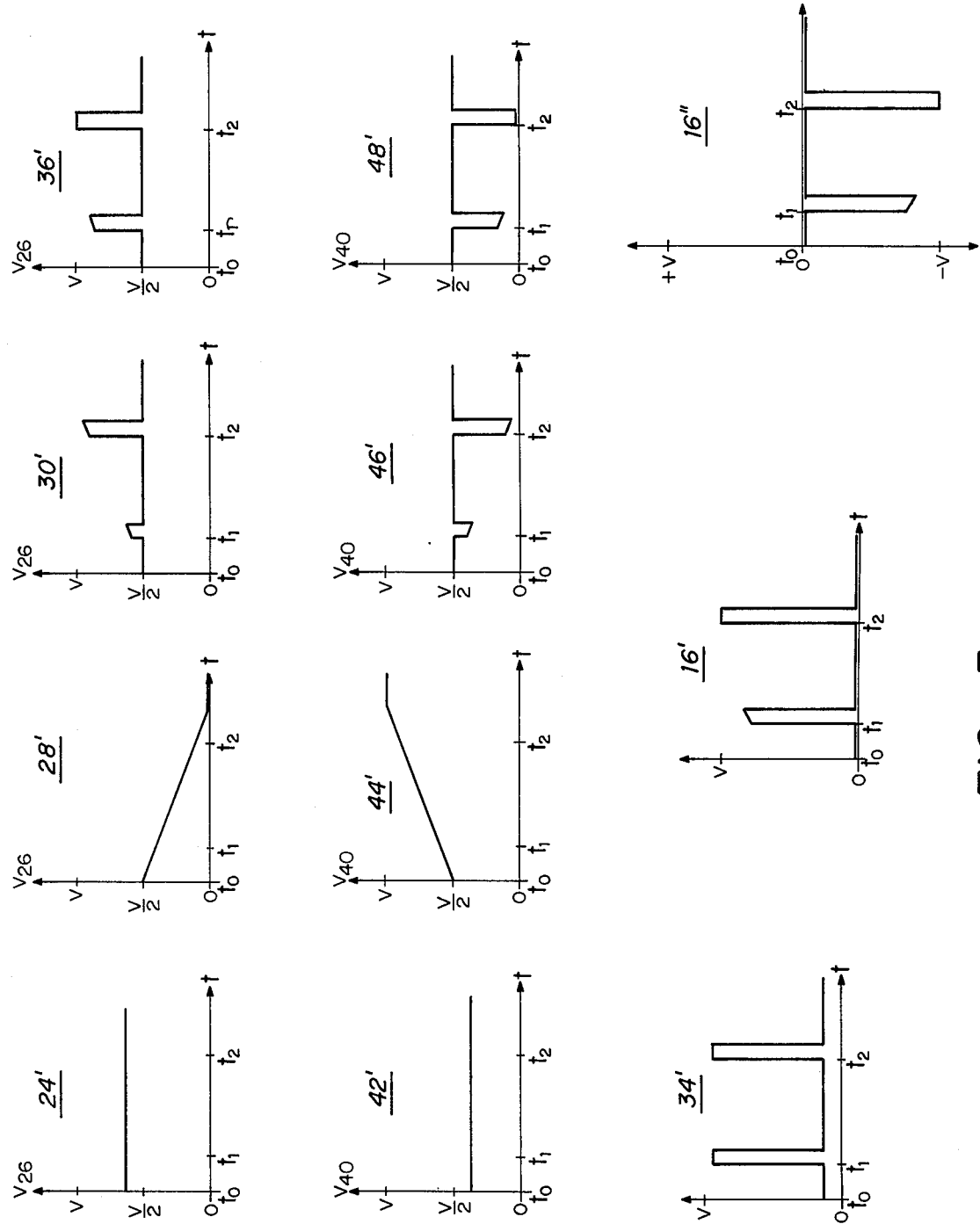
FIG. 3 is a series of waveforms illustrating the operation of the trim controller of FIG. 2.

In operation of the system of FIG. 2, assuming that the signal across the primary pitch trim integrating type servomotor 12 as applied to the terminals 22 is at some nonzero steady state level and the signal flow diagrams of FIG. 3 represent the waveforms of the amplifier channels 26 and 40 of FIG. 2. For purposes of identification, each of the signal flow diagrams is identified with a primed reference number corresponding to the associated block of FIG. 2. The duty cycle of the multivibrator 34 is considered to be of some steady state value as shown by the waveform 34'. To further distinguish between the amplifier channel 26 and the amplifier channel 40 the voltages of the channel 26 are identified with the subscript "26" and the voltages of the channel 40 are identified with the subscript "40".

In the quiescent state, a voltage output from the translators 24 and 42 is equal to one-half the supply voltage, that is, V/2, as generated at the output of the reference generator 60. For a zero signal condition across the primary pitch servomotor 12, the output of the voltage translators 24 and 42 are both at a steady state level equal to the output of the reference generator 60. For such a zero signal condition, the output of the integrators 28 and 44, the choppers 30 and 46 and the output stages 36 and 48 are at a level equal to the output of the reference generator 60, with reference to ground.

Injecting any nonzero voltage into the system as applied across the primary pitch servomotor 12 causes the voltage translators 24 and 42, the integrators 28 and 44, the choppers 30 and 46 and the output stages 36 and 48 to generate an output voltage that varies plus or minus relative to the reference voltage.

Assuming that a nonzero signal is applied to the terminals 22, the output of the voltage translator 24, as given by the waveform 24', changes to some positive voltage above the output of the reference generator, that is, above V/2. This positive increase in voltage level causes the integrator 28 to produce an integrated output that varies from the reference voltage V/2 until it eventually saturates at some point beyond time $t_2$, as shown by the waveform 28'. This integrated voltage as received by the chopper 30 is effectively gated through the chopper to the output stage 36. That is, the output voltage of the integrator 28 is passed to the input of the output stage 36. The gating function, however, takes place only during the duty cycle pulses as shown by the waveform 34' as generated at the output of the multivibrator 34. As illustrated by the waveform 30', the output of the chopper 30 has a 180° phase shift with respect to the output of the integrator 28. From the output of the chopper 30 the signal is transferred to the output stage 36 where it is amplified and applied across the pitch trim servomotor 16 through the terminal 38.

Considering now the amplifier channel 40 wherein a signal applied to the terminals 22 is coupled to the translator 42 to produce an offset of the output in a negative direction, as shown by the waveform 42'. This negative direction is again with reference to the voltage V/2 from the generator 60. This negative offset causes the integrator 44 output to increase positively as shown by the waveform 44' with the positive increase referenced to the voltage V/2 of the generator 60. This positive increase in the output of the integrator 44 continues until it saturates at the supply voltage connected to the integrator at a point beyond time $t_2$. As in the amplifier channel 26, the chopper 46 of the channel 40 passes the output voltage of the integrator 44 to the input of the output stage 48 during the duty cycle pulses of the multivibrator 34. Thus, as shown in waveform 46', at time $t_1$, one pulse is passed by the chopper 46 to the output stage 48 and at the time $t_2$ a second pulse is applied to the output stage 48. The output stage 48 amplifies the input pulses to generate the waveform 48' of two pulses at time $t_1$ and time $t_2$ and these voltage pulses are applied to the pitch trim servomotor 16 through the terminal 50.

For the signal waveforms as shown in FIG. 3, the amplifier channels 26 and 40 apply across the terminals 38 and 50 a voltage as given by the waveform 16'. This is a composite voltage derived from summing algebraically the voltages of the output stages 36 and 48 and is the voltage appearing across the pitch trim servomotor 16. Both the output stages 36 and 48 are operating in a saturated mode with the output stage 36 saturated at the supply voltage V and the output stage 48 saturated at ground. With reference to the curve 16'', this illustrates the voltage applied across the pitch trim servomotor 16 when the voltage applied to the terminals 22 is 180° phase displaced from a voltage that produces the waveforms of FIG. 3. Effectively, the waveform 16'' is the mirror image of the waveform 16'. Thus, during operation of the system of FIG. 2, the amplifier channels 26 and 40 function together to generate a composite output voltage to the pitch trim servomotor 16.

To vary the duty cycle of the choppers 30 and 46, the chopping frequency from the multivibrator 34, as shown by the waveform 34', is varied in accordance with a signal applied to the terminals 22. Basically, when a signal applied to the terminals 22 exists for a predetermined time the variable time constant network 58 generates an output that is applied to the multivibrator 34. This varies the pulse spacing at the output of the multivibrator. The pulse width, however, remains fixed but the time interval between time $t_1$ and time $t_2$ varies with the input signal.

This third channel of the system of FIG. 2 functions to increase the pulse repetition rate applied to the choppers 30 and 46 to increase the pulse repetition rate of the voltage applied to the pitch trim servomotor 16 thereby increasing its rotational velocity. Because of the time constant network 58, the pulse rate output from the multivibrator 34 is constrained to remain fixed unless the offset signal applied to the terminals 22 remains for an extended period of time. The repetition rate of the multivibrator 34 also varies for a very large offset that exists for a period of time longer than a preset level. In normal operation, however, that is, in the small signal range, the multivibrator 34 generates an output pulse repetition rate at some preselected minimum.

Figure 4A:
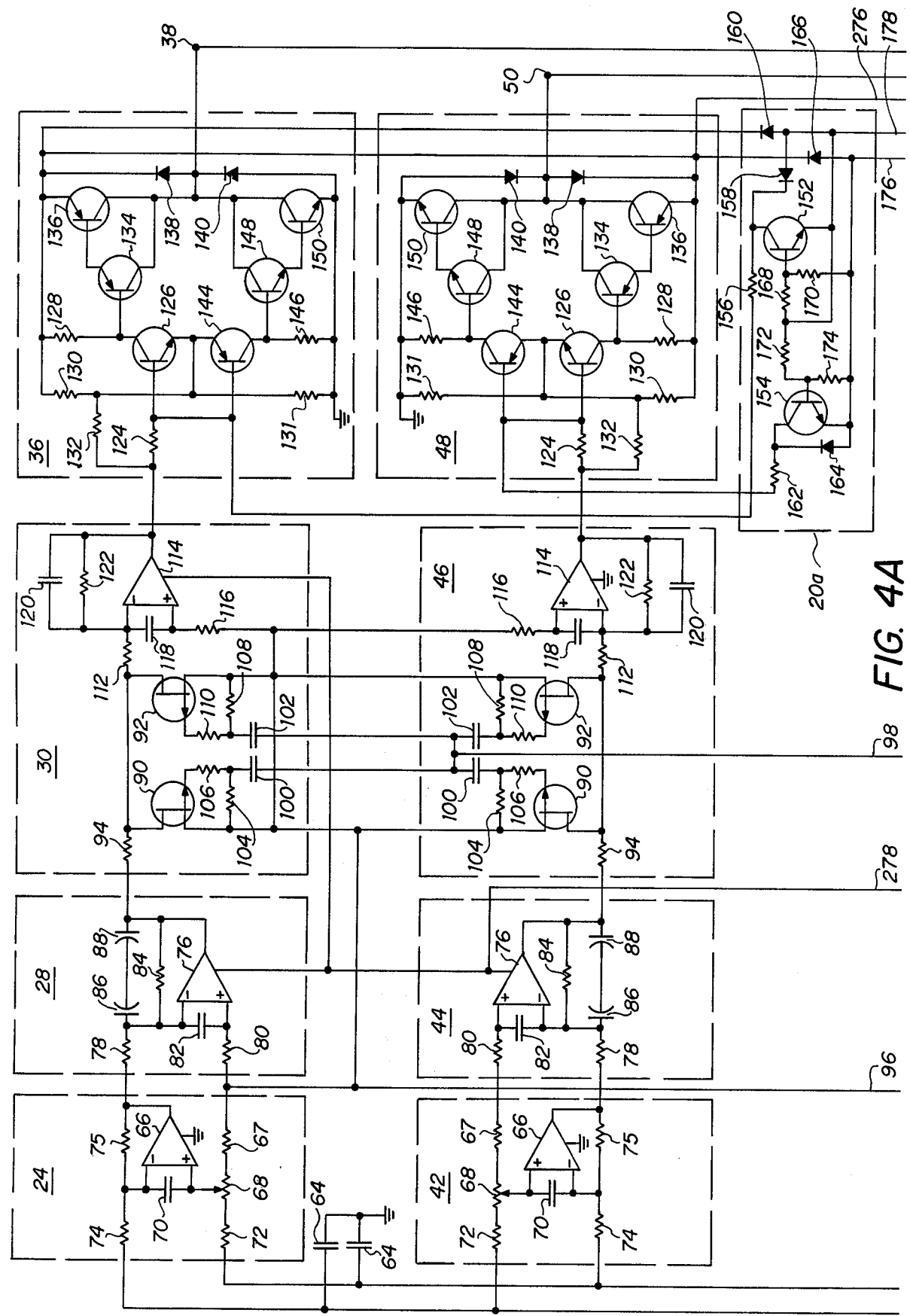
FIGS. 4A and 4B together comprise a schematic circuit diagram of an electronic trim system of the present invention.
Figure 4B:
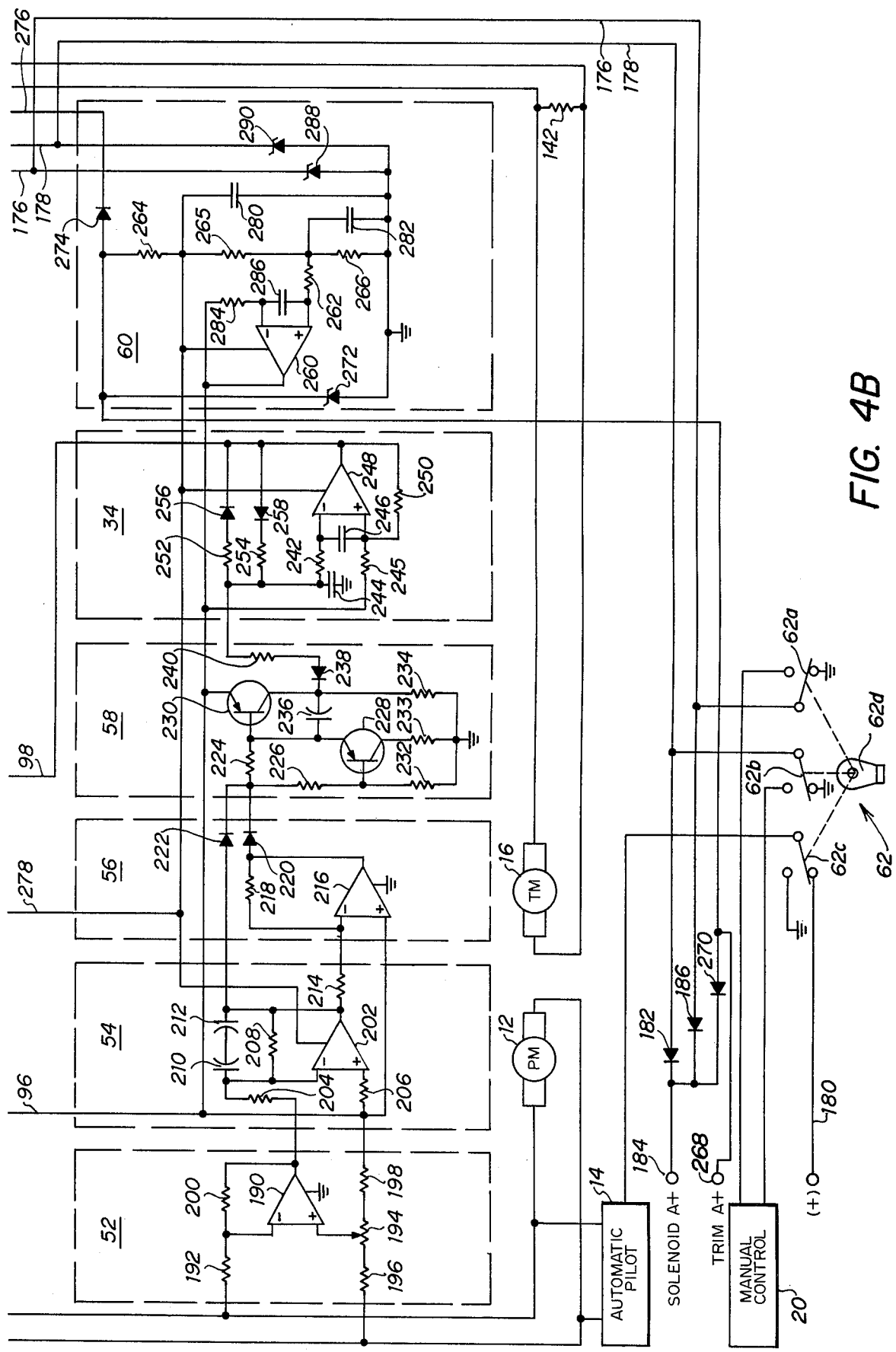

Referring to FIGS. 4A and 4B, there is shown schematically the trim controller 18 with the automatic pilot 14 connected to the manual controller 20 including a three-pole two position toggle switch 62. The output of the automatic pilot 14 applies an electrical signal to the integrating type servomotor 12 and to input terminals of the voltage translators 24, 42 and 52.

Two filter capacitors 64 are also connected to the output of the automatic pilot 14.

Each of the voltage translators 24 and 42 includes an operational amplifier 66 with a supply circuit including a resistor 67 and a potentiometer 68 with a capacitor 70 coupling the inverting and noninverting inputs of the operational amplifiers. The potentiometer 68 is also a part of an input circuit including a resistor 72. A resistor 74 comprises the second input circuit to the amplifier 66 and a resistor 75 is a part of a feedback loop from the output of the amplifier 66. Each of the translators 24 and 42 thus includes similar circuitry.

Connected to the translators 24 and 42 are the integrators 28 and 44, respectively, each including an operational amplifier 76. The input circuits for each of the operational amplifiers 76 includes resistors 78 and 80 interconnected by means of a coupling capacitor 82. Coupled to the output terminal of each of the amplifiers 76 is a feedback loop including a resistor 84 in parallel with series connected capacitors 86 and 88 and all interconnected to the resistor 78.

The time average outputs of the integrators 28 and 44 are tied to input terminals of choppers 30 and 46, respectively. Each of the choppers 30 and 46 includes dual switching transistors 90 and 92. Each of the transistors 90 or 92 could function independently to provide the chopping function to the time average output of the integrators 28 and 44. Two transistors are provided for increased reliability of the circuit.

An input circuit to each of the transistors 90 and 92 includes a resistor 94 connected to one of the drain electrodes. The source electrode of each of the transistors 90 and 92 are all interconnected to the output of the reference generator 60 by means of a supply line 96. The chopping duty cycle for each of the switching transistors 90 and 92 is provided on a line 98 connected to capacitors 100 and 102. Capacitor 100 is interconnected to a biasing network including resistors 104 and 106 with the latter connected to the gate electrode of the transistor 90. Similarly, the capacitor 102 is interconnected to a biasing network including resistors 108 and 110 with the latter connected to the gate electrode of the transistors 92.

The time average output of the integrators 28 and 44 as chopped by the transistors 90 and 92 is applied through a resistor 112 to one input of an operational amplifier 114. The second input of the operational amplifier 114 is connected through a resistor 116 to the supply line 96. Interconnecting the two resistors 112 and 116 is a capacitor 118. The feedback path for the operational amplifiers 114 includes a capacitor 120 in parallel with the resistor 122. Again, the circuitry of the choppers 30 and 46 is similar to provide a pulse rate modulated signal to the input terminal of the output stages 36 and 48, respectively.

The pulse rate modulated signal from the respective chopper is applied to each of the output stages 36 and 40 at an input resistor 124 connected to the base electrode of a transistor 126. The biasing circuit for the transistor 126 includes a collector resistor 128 and a divider network including resistors 130 and 132. Connected to the collector electrode of the transistor 126 is a Darlington pair including transistors 134 and 136 with the interconnected collector electrodes connected to diodes 138 and 140 and the respective output terminal 38 or 50 for each of the output stages 36 and 48. That is, the interconnected collector electrodes for the transistors 134 and 136 of the output stage 36 connects to the output terminal 38 and the interconnected collector electrodes for the output stage 48 connects to the output terminal 50. The output terminals 38 and 50 are connected to opposite terminals of the trim servomotor 16. Connected in parallel with the trim servomotor 16 is a load resistor 142.

Also included in the output stages 36 and 48 is a transistor 144 having a base electrode connected to the resistor 124, an emitter electrode connected to the emitter electrode of the transistor 126 and a collector electrode connected to ground through a resistor 146. Connected to the collector electrode of the transistor 144 is a Darlington pair including transistors 148 and 150 having a common collector connection to a common collector connection of the transistors 134 and 136.

The base electrode of the transistors 144 of each of the output stages 36 and 48 is connected to a manual switch 20a as part of the manual controller 20. Transistor 144 of the output stage 36 is connected to the collector electrode of a transistor 152 and the transistor 144 of the output stage 48 is connected to a transistor 154. In the collector electrode line for the transistor 152 to the transistor 144 is a bias resistor 156. Also connected to the collector electrode is a diode 158 having an anode electrode coupled to the anode electrode of a diode 160 connected to the emitter electrode of the transistor 136 of the output stage 36. A similar circuit arrangement is provided for the transistor 154 and includes a bias resistor 162 and a diode 164 connected to the collector electrode and a diode 166 having a common anode connection to the diode 164. The cathode of the diode 166 connects to the emitter electrode of the transistor 136 of the output stage 48. The base drive circuit for the transistor 152 includes resistors 168 and 170 and the base drive circuit for the transistor 154 includes resistors 172 and 174.

The common anode connection of the diodes 164 and 166 is connected by means of a line 176 to contact 62a of the switch 62. Similarly, the interconnection of the diodes 158 and 160 is connected by means of a line 178 to the contact 62b of the switch 6.

With the system under control of the automatic pilot 14, the contact 52c of the switch 62 interconnects a signal on the line 180 to the automatic pilot 14. The contacts 62a and 62b are connected to ground thereby rendering the manual switch 20a inoperative. To place the system in a manual mode, the pilot actuates the toggle 62d to move the contacts 62c of the switch 62 from the position shown to the second position. This grounds the automatic pilot 14 rendering it ineffective to control the servomotor 12 and disables all the signal handling circuitry up to the output stages 36 and 48. The lines 176 and 178 are now connected to the manual controller 20. The manual controller 20 grounds one of the lines 176 or 178 and supplies a control voltage to the opposite line. The two output stages 36 and 48 are thus always switched simultaneously to opposite power supply lines, that is, any time the output stage 36 is switched to the positive supply line, the output stage 48 is switched to ground, and vice versa. With this operation, the pitch trim servomotor 16 operates at full speed during manual operation in either direction.

Assuming that the line 176 is grounded in the manual controller 20, and the control signal is applied to the line 178, this forward biases a diode 182 that energizes a trim motor solenoid connected to a terminal 184. The voltage on the line 178 is also coupled through the diode 160 to the positive supply input of the output stage 36 at the emitter electrode of the transistor 136. The voltage on the line 178 is also coupled through the diode 158 and through the resistor 156 to the base electrode of the transistor 126 to turn on the transistors 136 and 150 to provide an output voltage at the terminal 38. At the same time, the line 176 is connected to ground. Thus, the emitter electrode of the transistor 154 is grounded and the base electrode is coupled to a positive voltage on the line 178. This turns on the transistor 154 thereby grounding the base of the transistors 126 and 144 of the output stage 48. Grounding the base electrodes of the transistors 126 and 144 drives the transistors 136 and 150 to ground the output terminal 50.

Thus, by operation of the toggle switch 62 of the manual controller 20 the terminal 38 is at a positive voltage and the terminal 50 is at ground thereby generating a voltage differential across the trim servomotor 16. This drives the motor in a prescribed direction.

To reverse the direction of rotation of the trim servomotor 16, the line 178 is grounded and a voltage is applied to the line 176. Under this set of conditions, the transistor 152 grounds the base electrode of the transistors 126 and 144 of the output stage 36 driving the output terminal 38 to ground and a voltage applied through the diodes 166 and 164 drives the output terminal 50 to the voltage on the line 176.

The duty cycle modulating channel is schematically shown in FIG. 4B, where the voltage translator 52 includes an operational amplifier 190 having one input tied through a resistor 192 to the automatic pilot 14 and a second input tied through a potentiometer 194 in series with a resistor 196 to the opposite terminal of the autopilot 14. The potentiometer 194 also forms a part of a supply circuit including a resistor 198 tied to the supply line 96. A feedback circuit for the amplifier 190 includes the resistor 200 connected to the resistor 192.

An output signal from the amplifier 190 is coupled to an operational amplifier 202 of the integrator 54 through an input resistor 204. A second input to the amplifier 202 is connected to the supply line 96 through an input resistor 206. In the feedback circuit for the amplifiers 202 a resistor 208 is connected in parallel with series capacitors 210 and 212. This circuit is similar to the integrators 28 and 44 and includes an output resistor 214 tied to one input of an operational amplifier 216 as part of the absolute voltage generator 56.

A second input to the amplifier 216 is direct coupled to the reference supply line 96. In a feedback circuit for the amplifier 216 is a resistor 218 connected to the amplifier input at the resistor 214. Also connected to the output of the amplifier 216 is a diode 220 having a common cathode connection with a diode 222. The anode of the diode 222 connects to the output of the amplifier 202 of the integrator 54.

The common connection of the diodes 220 and 222 forms an interconnecting terminal for resistors 224 and 226 as a part of the variable time constant network 58. The resistors 224 and 226 form a bias circuit for transistors 228 and 230 connected as an emitter follower pair. The biasing network for the transistors 228 and 230 further includes resistors 232 234. The emitter electrode of the transistor 230 is tied to the supply line 96. Connected to the cathode electrode of the transistor 230 is a capacitor 236 and a diode 238, the latter in series with a resistor 240 for providing a control signal to an input resistor network of the multivibrator 34.

The input resistor network of the multivibrator 34 includes a resistor 242 and capacitors 244 and 246. A signal from the time constant network 58 is applied through the resistor 242 to an operational amplifier 248 having a second input tied to the supply line 96. There are two feedback circuits for the operational amplifier 248, one including a resistor 250 and a second including parallel resistors 252 and 254 each in series with a diode 256 and 258, respectively. The output of the operational amplifier 248 is applied to the line 98 connected to the choppers 30 and 46 at the capacitors 100 and 102.

The reference generator 60 supplies reference voltages to various components of the trim controller 18. This generator includes an operational amplifier 260 with one input connected to a voltage divider network through resistor 262. The voltage divider network consists of series resistors 265 and 266 with the resistor 264 connected to a plus terminal 268. A voltage regulating Zener diode 272 is connected in parallel with the resistors 264, 265 and 266.

Also connected to the terminal 268 is a diode 274 for supplying drive voltages on a line 276 to the output stages 36 and 48. At the interconnection between the resistors 264 and 265 a drive voltage is applied on a line 278 to the various operational amplifiers of the circuit. Two filter capacitors 280 and 282 are also connected to the voltage divider network. The feedback circuit for the amplifier circuit includes a resistor 284 in series with a capacitor 286 also tied to the second input terminal of the amplifier 260.

The reference generator 60 also includes Zener diodes 288 and 290 as part of the manual control power supply. These Zener diodes function to limit the maximum voltage applied to the output stages 36 and 48 from the manual controller 20.

Operationally, the schematic of FIGS. 4A and 4B is as explained with reference to FIG. 2. The total circuitry comprises the trim controller 18 to drive the trim servomotor 16 in accordance with an electrical signal applied to the servomotor 12 from the autopilot 14.

While only one embodiment of the invention, together with modifications thereof, has been described in detail herein and shown in the accompanying drawings, it will be evident that various further modifications are possible without departing from the scope of the invention.

What is claimed is:

1. An aircraft control system, comprising in combination:
    an automatic pilot having a primary servo system for moving a primary control surface of an aircraft, the primary servo system including a primary servomotor coupled to the primary control surface and means for applying an electrical signal to actuate the servomotor and thereby move the primary control surface;
    means including a two terminal, trim servomotor for actuating a trim control means associated with the primary control surface;
    a first amplifier channel connected to respond to the electrical signal applied to the primary servomotor and providing an output of one polarity;
    a second amplifier channel connected to respond to the electrical signal applied to the primary servomotor and providing an output having a polarity complementary to the output of the first amplifier channel; and
    means for connecting the output of said first channel to one terminal of said trim servomotor and the output of the second channel to the second terminal of the trim servomotor.

2. An aircraft control system as set forth in claim 1 wherein each of said amplifier channels includes:
    means for generating a time average of the electrical signal applied to the direct current motor; and
    means for converting the time average of the electrical signal into a cycling voltage at the output of each of the amplifier channels and connected to opposite terminals of the trim servomotor.

3. An aircraft control system as set forth in claim 2 wherein said means for converting in one of the amplifier channels generates a cycling voltage 180° phase displaced from the cycling voltage of the means for converting in the second amplifier channel.

4. An aircraft control system as set forth in claim 2 wherein each of the amplifier channels includes means for amplifying the cycling voltage into a square wave output for connecting to opposite terminals of the trim servomotor.

5. An aircraft control system as set forth in claim 1 including means responsive to the electrical signal applied to the primary servomotor and coupled to said first and second amplifier channels to duty cycle modulate the output thereof in accordance with the electrical signal applied to the primary servomotor to limit the rate at which the trim servomotor operates.

6. An aircraft control system as set forth in claim 5 wherein said means for varying the duty cycle of each of the amplifier channels includes:
    means for generating a time average of the electrical signal applied to the direct current motor; and
    means for converting the average of the electrical signal into a variable frequency signal connected to each of the amplifier channels.

7. An aircraft control system as set forth in claim 6 wherein said means for converting the average of the electrical signal includes a multivibrator producing a variable frequency signal in accordance with the time average of the electrical signal.

8. An aircraft control system, comprising in combination:
    a primary servo system for operating a primary control surface in response to an electrical signal;
    a trim servo system for operating trim means for the primary control surface, including a two terminal servomotor coupled to drive the trim means;
    a first amplifier channel connected to respond to the electrical signal and providing an output of one polarity;
    a second amplifier channel connected to respond to the electrical signal and providing an output of a polarity complementary to the output of the first amplifier channel; and
    means connecting the output of said first channel to one terminal of said servomotor and the output of the second channel to the second terminal of the servomotor.

9. An aircraft control system as set forth in claim 8 wherein each amplifier channel includes:
    a translator responsive to the electrical signals applied to the primary servosystem for converting the signal into a single ended voltage varying about a reference level;

means for integrating the single ended voltage to generate a time average of the electrical signal;

means for converting the average of the electrical signal into a cycling voltage; and means for amplifying the cycling voltage into a square wave output voltage connected to operate the electric motor of the trim servosystem.

10. An aircraft control system as set forth in claim 9 wherein the square wave output voltage from one amplifier channel is 180° phase displaced from the square wave output voltage signal from the second amplifier channel.

11. An aircraft control system as set forth in claim 8 including manually actuatable means connected to each of the amplifier channels to render said channels nonresponsive to changes in the average of the electrical signal and providing a manual signal to said means for applying to operate the electric motor of the trim servosystem in accordance with a manual input signal.

12. An aircraft control system as set forth in claim 11 wherein each of said amplifier channels includes means for amplifying the changes in the average of the electrical signal to produce amplified voltage signals; and said manually actuatable means includes switching means for driving said means for amplifying in each of the amplifier channels independent of the electrical signals to produce control voltages to operate the electric motor of the trim servosystem.

13. An aircraft control system as set forth in claim 8 including means responsive to the electrical signal and coupled to said first and second amplifier channels to duty cycle modulate the output thereof in accordance with the electrical signal to limit the rate at which the servomotor operates.

14. An aircraft control system as set forth in claim 13 wherein said means for varying the duty cycle of each of the amplifier channels includes:

a multivibrator for providing a variable frequency signal to each of the amplifier channels; and a time constant circuit responsive to the electrical signal and having a time constant varying in accordance with the applied electrical signal for producing an output to control said multivibrator.

15. An aircraft control system, comprising in combination:

a primary servosystem for moving a primary control surface of an aircraft, said system including a reversible direct current motor energized by an applied varying electrical signal;

a translator responsive to the electrical signal for converting the signal into a single ended voltage varying about a reference level;

means for integrating the single ended voltage to generate a time average of the electrical signal;

means for converting the average of the electrical signal into a cycling voltage;

means for amplifying the cycling voltage into a square wave output control voltage; and means including a trim servomotor responsive to the output control voltage for actuating a trim control means for the primary control surface.

16. An aircraft control system as set forth in claim 15 including means for varying the duty cycle of each of the amplifier channels in accordance with the electrical signal to limit the rate at which the trim servomotor operates.

17. An aircraft control system as set forth in claim 16 wherein said means for varying the duty cycle of each of the amplifier channels includes:

a translator responsive to the electrical signal for converting the signal into a single ended voltage varying about a reference level;

means for integrating the single ended voltage to generate a time average of the electrical signal;

means for converting the average of an electrical signal into an absolute value signal;

means responsive to the absolute value signal for generating a variable rate pulse signal varying with the applied electrical signal; and a multivibrator responsive to the variable rate pulse signal for generating a frequency varying in accordance with the electrical signal and applied to each of the means for converting of the pair of amplifier channels.

18. An aircraft control system as set forth in claim 15 wherein the square wave output control voltage from one of said amplifier channels is 180° phase displaced from the square wave output control voltage from the other of said amplifier channels.

19. An aircraft control system as set forth in claim 15 including manually actuatable means coupled to the means for amplifying in each of the amplifier channels to control the square wave output voltage in accordance with a manual input signal.

20. An aircraft control system as set forth in claim 19 wherein said manually actuatable means includes switching means for disabling the means for amplifying in one of the amplifier channels and for controlling the output of the means for amplifying in the second of the amplifier channels.

21. An aircraft control system for adjusting the pitch trim of an aircraft control by an autopilot having an integrating servo system for the primary pitch control comprising a reversible, direct current servomotor responsive to an applied electrical signal and coupled to the primary control surface, comprising:

a trim servomotor;

means for integrating the electrical signal applied to the primary servomotor over a time interval to provide an output voltage; and means for duty cycle modulating the output voltage to provide an operation of the trim servomotor to limit the speed at which the trim servomotor operates.

22. An aircraft control system as set forth in claim 21 including means for producing equal and opposite voltage signals as a function of the average electrical signal applied to the primary servomotor and applying the difference of the equal and opposite voltage signals to the trim servomotor.

* * * * *